(12) United States Patent
Thomaschewski et al.

(10) Patent No.: US 8,939,507 B2
(45) Date of Patent: Jan. 27, 2015

(54) BACKREST FOR A VEHICLE SEAT

(71) Applicant: Lufthansa Technik AG, Hamburg (DE)

(72) Inventors: Oliver Thomaschewski, Norderstedt (DE); Jacques Pierrejean, Pietrosella (FR)

(73) Assignee: Lufthansa Technik AG, Hamburg (DE)

( * ) Notice: Subject to any disclaimer, the term of this patent is extended or adjusted under 35 U.S.C. 154(b) by 0 days.

(21) Appl. No.: 13/902,221

(22) Filed: May 24, 2013

(65) Prior Publication Data

US 2014/0159455 A1    Jun. 12, 2014

(30) Foreign Application Priority Data

May 24, 2012   (DE) .......................... 10 2012 208 725

(51) Int. Cl.
| | | |
|---|---|---|
| *A47C 3/00* | (2006.01) | |
| *A47C 7/02* | (2006.01) | |
| *A47C 7/14* | (2006.01) | |
| *B60N 2/64* | (2006.01) | |
| *B60N 2/68* | (2006.01) | |
| *B60N 2/22* | (2006.01) | |
| *B64D 11/06* | (2006.01) | |
| *B60N 2/70* | (2006.01) | |
| *B60N 2/02* | (2006.01) | |

(52) U.S. Cl.
CPC .. *B60N 2/64* (2013.01); *B60N 2/68* (2013.01); *B60N 2/682* (2013.01); *B60N 2/2222* (2013.01); *B64D 11/06* (2013.01); *B60N 2/643* (2013.01); *B60N 2/7011* (2013.01); *B64D 2011/0627* (2013.01); *B60N 2002/022* (2013.01)

USPC ...................... 297/284.3; 297/284.1; 297/312; 297/314; 297/452.63

(58) Field of Classification Search
USPC ..................... 297/406, 284.3, 216.12, 216.18, 297/452.63, 284.1, 312, 314, 284.2, 284.4, 297/284.7, 284.8

See application file for complete search history.

(56) References Cited

U.S. PATENT DOCUMENTS

| | | | |
|---|---|---|---|
| 4,881,777 A | | 11/1989 | Dorshimer |
| 5,228,747 A | * | 7/1993 | Greene ...................... 297/284.3 |
| D438,392 S | * | 3/2001 | Lucci et al. .................... D6/366 |
| 6,609,754 B2 | | 8/2003 | Rajasingham |
| 6,752,460 B2 | | 6/2004 | Looser |
| 6,910,736 B2 | | 6/2005 | White |
| D527,557 S | * | 9/2006 | Reimers ......................... D6/502 |
| 7,273,252 B2 | * | 9/2007 | Iijima et al. ................ 297/284.3 |
| 7,648,201 B2 | | 1/2010 | Eysing |
| 7,784,871 B2 | * | 8/2010 | Cochran ....................... 297/338 |
| 7,909,402 B2 | | 3/2011 | Chu et al. |
| 8,091,964 B2 | * | 1/2012 | Carter et al. ............. 297/216.17 |
| 2004/0195882 A1 | * | 10/2004 | White ......................... 297/284.3 |
| 2004/0256899 A1 | * | 12/2004 | Moore et al. ............... 297/284.3 |
| 2010/0066135 A1 | | 3/2010 | Humer et al. |

FOREIGN PATENT DOCUMENTS

| | | |
|---|---|---|
| DE | 3100770 | 8/1982 |
| DE | 10054826 | 5/2002 |
| EP | 0 754 591 | 1/1997 |

(Continued)

*Primary Examiner* — Chi Q Nguyen
(74) *Attorney, Agent, or Firm* — Saliwanchik, Lloyd & Eisenchenk

(57) ABSTRACT

The invention relates to a backrest for a vehicle seat, wherein the backrest includes a plurality of backrest modules. The backrest modules comprise a central portion, and at least one backrest module is mechanically linked to one or two further backrest modules of similar type at the central portion.

20 Claims, 5 Drawing Sheets

(56) References Cited

FOREIGN PATENT DOCUMENTS

| | | |
|---|---|---|
| EP | 1 693 248 | 8/2006 |
| EP | 2028041 | 2/2009 |
| EP | 2 039 271 | 3/2009 |
| FR | 2840786 | 12/2003 |
| JP | 2007106356 | 4/2007 |
| WO | WO-02/102203 | 12/2002 |
| WO | WO-2006-019241 | 2/2006 |
| WO | WO-2012/149978 | 11/2012 |

* cited by examiner

BACKREST FOR A VEHICLE SEAT

CROSS-REFERENCE TO RELATED APPLICATION

The application claims priority under 35 U.S.C. §119(e) of German Patent Application No. DE 10 2012 208 725.7, filed on May 24, 2012, which is hereby incorporated by reference in its entirety.

BACKGROUND OF INVENTION

The present invention relates to a backrest for a vehicle seat.

Seats generally comprise a backrest that serves to support the back of a sitting person. Many different designs in respect of dimensions and upholstery are known for backrests of seats.

For seats in a vehicle, like for example a car, bus, aircraft, helicopter or boat, special mechanical requirements are to be complied with that go far beyond the requirements of a seat for the stationary, immobile application, for example in houses. In a vehicle, the movements and accelerations of the vehicle need to be transmitted to the sitting person via the vehicle seat. This is necessary particularly in the event of an accident with quite high accelerations to stabilize the sitting person accordingly.

The backrests for vehicle seats thus comprise a stable mechanical structure inside, for which proof can be given that it complies with the requirements for the event of an accident.

The mechanical structure of a conventional vehicle seat thus leads to a low variability in the outer design, which is achieved through modifications to the seams, the surface fabrics and minor variations in the upholstery. This conflicts with the many different designs that are known from the immobile sector, where there are many different backrests without special requirements, and which are desired by the users.

A desired vehicle seat which cannot be realized due to the low variability of a conventional vehicle seat necessitates a time-consuming and expensive re-design and new manufacturing facilities or tools as well as, where required, a new official approval for the corresponding vehicle. Pursuant to the respective applicable regulations, a time-consuming procedure of furnishing proof involving calculations and tests may be required therefor.

It is the object of the invention to provide a backrest for a vehicle seat which allows for a simpler and better design in respect of individual requirements.

BRIEF SUMMARY

The object of the invention is solved with a backrest for a vehicle seat includes a plurality of backrest modules, the backrest modules comprising a central portion, and at least one backrest module at the central portion being mechanically linked to one or two further backrest modules of similar type, at least two backrest modules being movable relative to each other around an axis. The movability between at least two backrest modules can be blocked by a user.

DETAILED DISCLOSURE

Figure 1:
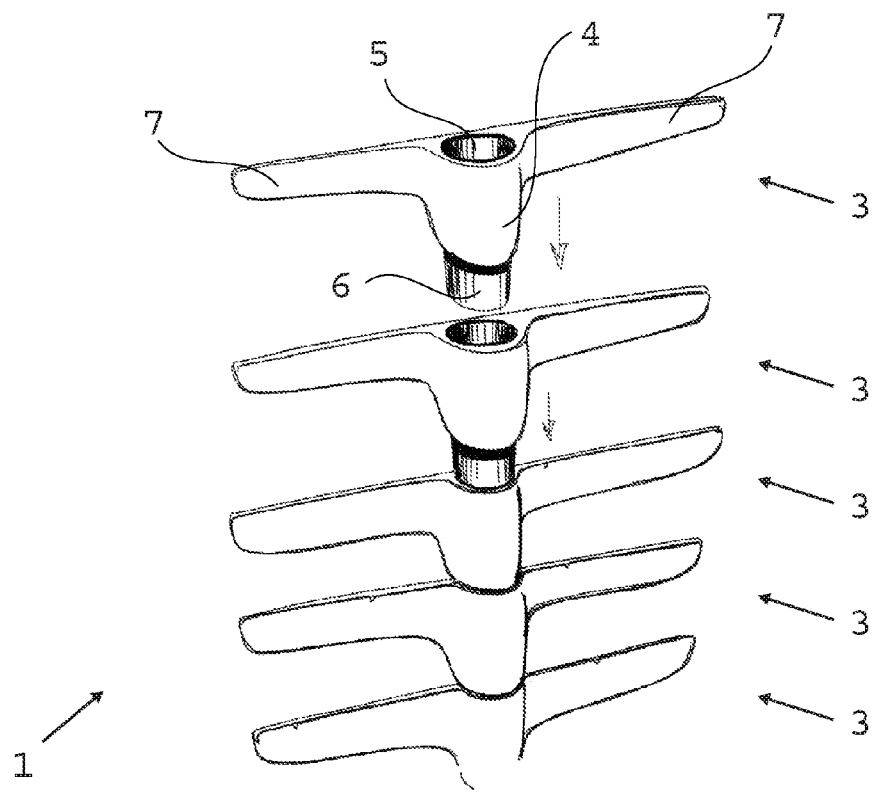
FIG. 1 shows an exploded view of a backrest comprising several backrest modules.

By means of the proposed solution, a vertebra-like structure of the backrest modeled on the human spine is provided, which allows for a highly variable shaping, in particular a possible adaptation to the back of a sitting person. The backrest modules form a link chain-like backrest for a vehicle seat.

The vertebra structure or modular structure of the backrest comprising several backrest modules allows for a variation of the height of the backrest depending on the used backrest modules. The backrest modules may be identical components allowing for a cost-effective manufacturing. Alternatively, individually dimensioned backrest modules may be used for the backrest. The various backrest modules may be linked in a varying order, arrangement or number, so that a comparatively small number of different backrest modules may result in a high diversity of variants for the backrest. The appearance of the backrest thus can be diversified with a small number of standard backrest modules.

The backrest modules in the backrest are mechanically linked to each other in a central portion, so that mechanical loads occurring at the backrest via the linked central portions of the individual backrest modules can be transmitted to a further mechanical structure of the vehicle seat in the area of the seating surface. The main load path for the mechanical loads can be formed by the linked central portions of the backrest modules.

A preferably restricted rotatability relative to each other provides an active seating for the sitting person and a high flexibility with great comfort, and even very thin and/or even firm cushions can be used without a loss in comfort.

The blocking of the movability is of advantage in particular when using the backrest on an aircraft for being able to provide the highest possible comfort during the cruising phase through the rotatability, whereas during critical flight phases, like taxi, take-off or landing, the sitting person is stabilized in the event of a possible accident. The blocking further is of advantage when using the backrest in an almost horizontal position in a sleeping or resting position of the vehicle seat, in order that the sitting or rather lying person does not roll off the vehicle seat.

In a possible advantageous embodiment, the movability between at least two backrest modules can be blocked by shortening the backrest in the axis. A defined state of the seat for a critical phase can be obtained that way, the demands on comfort becoming less important in the event of a blocking. In a preferred embodiment, the backrest modules are spaced from each other at a distance that allows a relative movement. This distance can be realized by means of a spring load. The shortening of the backrest is able to reduce this distance up to a positive fit between the backrest modules, so that further relative movements of the backrest modules are prevented through the shortening of the backrest.

The movability between at least two backrest modules further can be blocked preferably by means of at least one rope-like linkage extending along the axis of the backrest. The rope-like linkage preferably can be used to reduce the distances of the backrest modules against a possible spring load and to shorten the backrest accordingly, so that further movements of the backrest modules relative to each other are prevented for example due to a positive fit. In an alternative embodiment, it may be possible that the rope-like linkage extends along the outer section of the wings and, in the case of the movability of the topmost and the lowermost backrest module being blocked, prevents the backrest modules located in between from moving by tightening the rope-like linkage.

Preferably at least one backrest module comprises an attachment point for a safety belt. An attachment point for a safety belt is an element which is adapted to absorb and/or deflect belt forces. An attachment point may include a deflector roll, a belt retractor, a mounting position and/or a belt buckle. In advantageous embodiments, the attachment point is located on the topmost or on the second topmost backrest module. In advantageous embodiments, attachment points further may be located on the lowermost backrest module. In preferred embodiments, the attachment point is located on a wing of the backrest module. This backrest module or this wing is preferably not movable in seating direction towards the front.

Preferably at least two backrest modules engage into each other at the central portions of the backrest modules. The engagement of two backrest modules is advantageous for establishing a stiff mechanical linkage which prevents a displacement in particular a translational displacement of the backrest modules relative to each other. Furthermore, the engagement provides the advantage that the backrest modules can be mounted in an easy and rigid way to form the backrest.

In an advantageous embodiment, at least one backrest module on a first side of the central portion comprises a recess for mounting a connector element of a further backrest module, and on a second side of the central portion it comprises a connector element. The recess may be for example an opening, a deepening and/or a bore, which is capable of enabling a positive connection with the connector element of another backrest module. A positive connection can easily establish a mechanical linkage acting in multiple directions between two backrest modules.

In this case, the connector element is an extension or, generally, a projecting contour, the shape of which is adapted to the recess, resulting in a connector system which can be extended to any length.

In a further advantageous embodiment, the connector element of at least one backrest module has the shape of a journal. Due to the journal shape, for example a rotatability of the backrest modules relative to each other can be realized. Moreover, the journal shape serves to form a continuous inherently stable core structure of the backrest, which due to the journals of the backrest modules has an overall column-like structure.

Preferably at least one backrest module comprises two side wings which extend from the central portion. The side wings are able to transmit mechanical loads, for example from the back of a sitting person, to the central portion of the backrest module. The wings of the backrest modules can form a backrest showing a surface coverage or a surface-like coverage. Surface-like relates to the effect of absorbing the loads of a sitting person, while possible distances between the wings of different backrest modules do not reduce the effect.

In a preferred embodiment, the wings are exchangeable at the central portion. Thus, different wings can be mounted on the same central portion of a backrest module, resulting in a potentially high variability for the appearance of the backrest and for a vehicle seat as a whole, without having an essential effect on the main load path of the mechanical structure. The wings may have different dimensions and designs.

In an advantageous embodiment, the wings are movably mounted on the central portion. The movability relates to the alignment of a main axis of a wing relative to the central portion of the respective backrest module. The comfort can thus be improved with little upholstery material. In possible advantageous embodiments, the wings are movable independently. In advantageous embodiments, the wings further can only be moved against the seating direction out of a basic position and back to the basic position. In further advantageous embodiments, the movability of the wings can be blocked by a user.

In further advantageous embodiments, more than two wings are located on a central portion, i.e. at least one backrest module may comprise at least two wings extending from the central portion, for example four wings. The wings may be movable independently or coupled as a group. A coupling may be established at the side, so that at least two wings located on the backrest one on top of the other can move together in the same direction. Each wing further may be coupled to a wing on the opposite side at the same backrest height, a movability in opposite directions being advantageous in this case, so that for example by pushing a wing to the back the respective wing on the other side of the central portion moves to the front.

Preferably at least one backrest module on at least one side comprises upholstery. The upholstery is advantageous for the comfort of the sitting person. Furnishing more than one side or also partial portions of one side with upholstery can make sense for safety reasons and/or for weight saving purposes.

The respective backrest modules advantageously comprise varying upholstery with different firmnesses, thicknesses and/or covers. As a result, an improvement in the comfort and an individual design of the vehicle seat can be realized.

In a preferred embodiment, at least two backrest modules are movable relative to each other along the axis. This is able to provide for an advantageous adaptation for example to the height of a sitting person. The movement along the axis, which may be the middle axis of a journal-shaped connector element, is advantageous in particular for the two top backrest modules of the backrest, as that way the topmost backrest module is able to assume a function as a headrest which can get adjustable for a sitting person by the movement. The displacing mechanism is preferably integrated into the backrest modules.

In a further preferred embodiment, at least two backrest modules are movable relative to each other around a transverse axis. The transverse axis is located preferably parallel to the ground plane and preferably parallel to the frontal plane of a human being sitting in the vehicle seat. The movability around the transverse axis is able to provide for an adaptation to the back of a sitting person, resulting in an improvement in the comfort of the vehicle seat. In a preferred embodiment, the movability around a transverse axis is spring-loaded towards the sitting person. Furthermore, the movability is restricted in preferred embodiments.

Preferably at least one backrest module comprises a through opening in the central portion in the axis, and the backrest includes a support rod, the support rod being located in the through opening. The support rod extends through the through opening and may also be inserted only partially into an opening at the upper end of the backrest. At the lower end of the backrest, the support rod may be connected to further structures of a vehicle seat. The support rod may perform an additional load-bearing function in the backrest. The support rod may be designed to be round and/or tube-shaped, allowing a light-weight construction at a comparatively high stiffness. In a preferred embodiment, the support rod is located in such a way that it is mechanically coupled to all backrest modules of the backrest. Furthermore, the movability of the backrest modules relative to each other may be spring-loaded due to the stiffness of the support rod.

In an advantageous embodiment, the bending stiffness of the support rod in the direction of a first transverse rod axis is lower than in the direction of a second transverse rod axis located perpendicular to the first transverse rod axis. The differing stiffness in the two transverse rod axes in relation to the axis of the longest extension of the support rod advantageously may be realized through material and geometry of the support rod. A lower stiffness in a first transverse rod axis for example may result in a flexibility of the backrest which is comfortable for the sitting person when leaning back in the vehicle seat. In a second transverse rod axis, a higher stiffness is advantageous, as for example undesired evasive side movements of the backrest can be reduced that way.

The movability between at least two backrest modules further can be blocked by mechanically actuating the support rod. The mechanical actuation may be a movement, a displacement and/or any other mechanical adjustment of the support rod being able to induce an appropriate blocking.

In a possible advantageous embodiment, this can be effected by displacing the support rod in the direction of its main axis. In an alternative preferred embodiment, a blocking of the movability can be effected by turning the support rod in the openings of the central portions of the backrest modules.

The movability of at least two backrest modules relative to each other around a transverse axis preferably can be modified by turning an anisotropic support rod, as described in the preceding paragraphs, by 90 degrees and around its main axis, so that after the turning this transverse axis may show a significantly higher stiffness. In this embodiment, there preferably is a movability of at least two backrest modules relative to each other around one transverse axis only, so that this movability around the transverse axis, by turning the anisotropic support rod around its main axis, can accordingly be spring-loaded or, by turning the support rod to a position where it is turned by 90 degrees, it can be highly stiff, what may correspond to a blocking of the movability.

In a possible embodiment, the rotatability of backrest modules around an axis further can be blocked for example by means of an appropriate positive engagement upon a mechanical actuation by the sitting person.

FIG. 1 shows an exploded view of an embodiment of a backrest 1 for a vehicle seat 2. The backrest 1 consists of several backrest modules 3 forming the backrest 1.

The backrest modules 3 comprise a central portion 4, at which a mechanical linkage to further backrest modules can be established. The central portions 4 of the backrest modules 3 form a column-like load path via which the forces occurring at the backrest 1 can be absorbed and transmitted to the further seat structure of the vehicle seat 2.

In this embodiment, the central portion 4 of the backrest modules 3 on a first side, illustrated at the top of FIG. 1, comprises a recess 5. On the second side at the bottom shown in FIG. 1, the central portion 4 of the backrest modules 3 comprises a journal-shaped connector element 6. The connector element 6 is intended to be inserted into the recess 5 of another backrest module 3, in order to provide for a transmission of forces between the backrest modules 3 via the established mechanical linkage. In a possible embodiment, the backrest 1 can be formed from the backrest modules 3 in a connector arrangement.

In alternative embodiments, other designs and styles for the recesses 5 and connector elements 6 are possible. A possible locking mechanism and/or securing mechanism securing the assembly state is not shown.

In an advantageous embodiment, the connector elements 6 comprise an opening enabling cables and/or lines to be passed through the backrest modules 3 along the backrest 1.

In a preferred embodiment, the backrest modules 3 comprise side wings 7 which extend from both sides of the central portion 4. The side wings 7 broaden the backrest 1 accordingly, so that the back of a sitting person can be supported, among other things, by the side wings 7.

The backrest modules 3 of the embodiment shown in FIG. 1 are backrest modules 3 of the same kind, which by acting together form the backrest 1 of a vehicle seat 2. However, the backrest 1 may also be formed by backrest modules 3 of similar type. Backrest modules 3 of similar type may have different dimensions, designs, wing widths and/or wing lengths and/or further divergent features. In an advantageous embodiment, the section or sections of the central portion 4 for establishing the mechanical linkage however stay(s) the same, so that backrest modules 3 of similar type can be combined with each other.

The combination of different backrest modules 3 of similar type provides for manifold design variations with a small number of different backrest modules 3. The backrest 1 of the vehicle seat 2 thus can be completely custom-assembled, with the mechanical properties being maintained by using a standardized central portion 4, what in particular may serve to avoid a mechanical re-design and re-approval.

Figure 2:
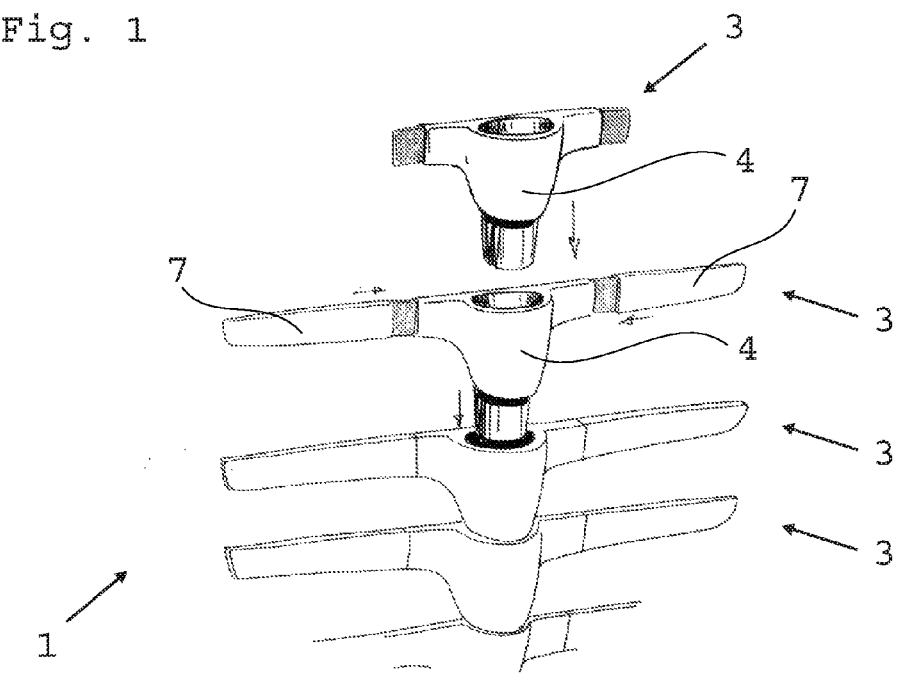
FIG. 2 shows an exploded view of several backrest modules comprising exchangeable wings.

FIG. 2 shows an embodiment of a backrest 1 comprising several backrest modules 3, the backrest modules 3 in this embodiment comprising exchangeable wings 7. The wings 7 thus can be exchanged by way of a corresponding mounting procedure, so that different variants and/or dimensions are easy to realize. The wings 7, just as in the preceding embodiments, absorb forces and transmit the same to the central portion 4 of the respective backrest module 3.

The exchangeability provides for a high diversity of variants, so that different vehicle seats 2 comprising different backrests 1 are easy to realize. The wings 7 in particular extend to the sides of the backrest 1 and thus co-determine the width and the appearance of the backrest 1.

In a further alternative embodiment, the wings 7 are movably mounted on the central portion 4 of a backrest module 3, so that the wings 7 may show flexibility in one or more directions. The movability of the wings 7 is preferably spring-loaded, so that a basic position as shown for example in FIG. 1 or FIG. 2 can be defined.

Figure 3:
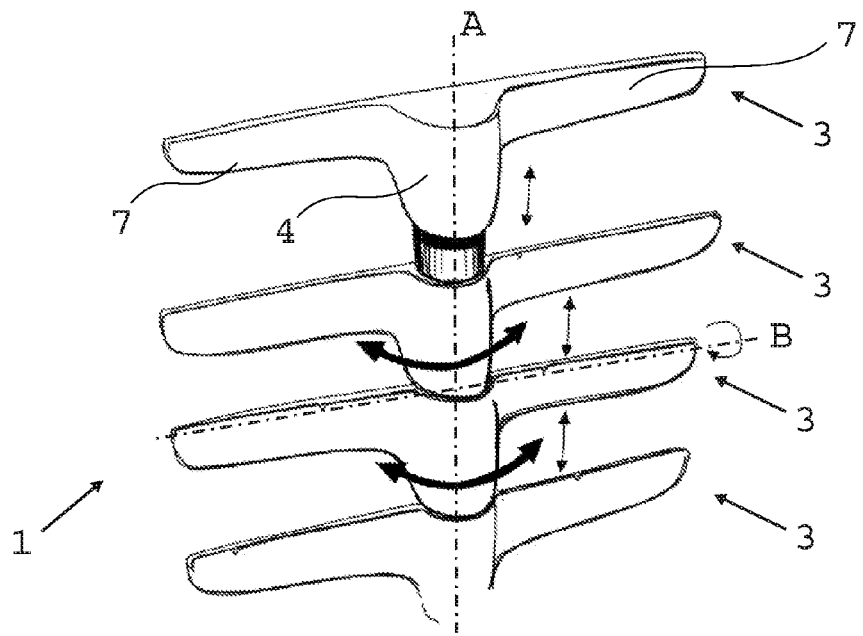
FIG. 3 shows several movable backrest modules.

A further advantageous embodiment is shown in FIG. 3. Here, several backrest modules 3 of the backrest 1 are movable relative to or towards each other. In particular a movability of backrest modules 3 around an axis A is advantageous. The backrest modules 3 thus are rotatable around said axis A, provided that the connector elements 6 are journal-shaped and in particular are cylindrical. This movability is preferably restricted and spring-loaded, so that in an unloaded state a basic position as shown in FIG. 3 appears. The rotational movement in this embodiment further is restricted. A sitting person is able to induce a rotation of individual or several backrest modules 3 around the axis A by exerting an appropriate force. These modules yield accordingly and that way are able to provide for a very comfortable and active seating on the vehicle seat 2. Due to the movability of the backrest modules 3 around the axis A, a comfort of the backrest 1 can be realized with thin upholstery or, in a possible embodiment, without additional upholstery.

The higher the position at the backrest 1, the movability of the backrest modules 3 and/or of the wings 7 relative to the basic position may increase. In advantageous embodiments, the topmost wings 7 and/or the topmost backrest module 3 thus show the highest movability or the greatest restriction. The spring load or the restoring force back to the basic position may also decrease the higher the position at the backrest 1. In possible embodiments, the lowermost backrest module 3 as well as its wings 7 may be immovable, what in particular provides mechanical advantages for a blocking of the further backrest modules 3.

In the embodiment shown in FIG. 3, the topmost backrest module 3 is movable along the axis A, so that the distance from the backrest module 3 located thereunder is variable and can be adjusted by a user. This is advantageous for an adaptation to the height of a sitting person. The height of the backrest 1 thus can be adjusted due to the corresponding movability. In the topmost backrest module 3 of FIG. 3, no further recess 5 is provided at the top. This backrest module 3 thus is equivalent to a headrest of the backrest 1.

In alternative embodiments, also several or all backrest modules 3 may be movable along the axis A, so that the relative distance from each other can be variable. The restriction of the movability along the axis A thus defines the minimum and the maximum height or length of the backrest 1. The movability of the backrest modules 3 along the axis A provides for an anatomic adaptation to the back of a sitting person. In advantageous embodiments, the backrest modules 3 of a backrest 1 are movable in two groups along the axis A, beneath these two groups a fixed group possibly being located, so that a high adjustability of the backrest 1 is realized with a simple structure. In this embodiment, a group may also be formed from one backrest module 3 only. Besides an adaptation to the length of the back, it is also possible to individually adapt the position of cushions to the corresponding points of the back of a sitting person in the axis A, so that for example upholstery for supporting the lumbar vertebrae can be positioned individually by the sitting person, while the total length of the backrest can also be maintained the same.

In a further embodiment, two backrest modules 3 are movable relative to each other around a transverse axis B. The result thereof is a relative rotational movement of two backrest modules 3 towards each other. This provides a flexibility and an adaptation to the back of a sitting person, which adaptation may offer an improved seating comfort. This seating comfort in particular can be realized with thin upholstery thicknesses, with the result that the total weight and the installation space of the vehicle seat 2 can be reduced. In advantageous embodiments, at a backrest 1 two backrest modules 3 each at two positions at the backrest 1 are movable relative to each other around a transverse axis B, whereas the further backrest modules 3 may be permanently blocked relative to each other.

The restriction can be realized by designing the mechanical linkage between the backrest modules 3 accordingly. The movability in viewing direction and against the viewing direction of a sitting person can be realized in different ways. In an advantageous embodiment, this movability of two backrest modules 3 around a transverse axis B is spring-loaded. The spring load in particular may be directed towards the back of a possible sitting person.

From a highly simplified point of view, the range of motion of the backrest 1 can be compared to the range of motion of a spine. The individual backrest modules 3 are able to perform relative movements towards each other. The mechanical linkages between two backrest modules 3 each may show different degrees of freedom. In an alternative embodiment, further relative movements between the backrest modules 3 are possible.

In an advantageous embodiment, the movability of the backrest 1 can be blocked by a user, for example a sitting person. A blocking of the backrest 1 may for example become necessary when using the vehicle seat 2 on an aircraft to comply with official requirements during certain flight phases, like for example take-off, landing and/or taxi. In case of an increased accident risk, the blocking of the movability of the backrest 1 may lead to an improved crash behavior of the vehicle seat 2. A blocking of the movability of the backrest 1 further is advantageous if the backrest 1 is set to a flat position and the vehicle seat 2 is adjusted in a resting or lying position. In such a case, by means of the blocking the sitting or rather lying person, if not positioned in the center of the vehicle seat 2, can be prevented from rolling off to the side owing to the movability for example around the axis A.

Figure 4:
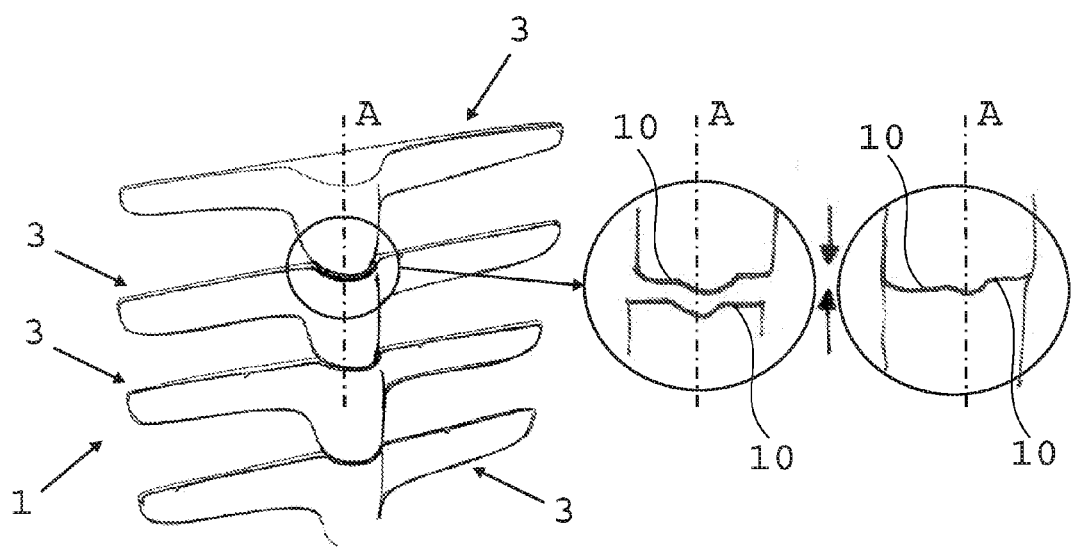
FIG. 4 shows backrest modules showing a blockable movability.

FIG. 4 shows a possible embodiment of a blocking mechanism which is able to effect a modification of the relative movability between two or more backrest modules 3. Two surfaces 10 of two backrest modules 3 in a movable position are spaced so far from each other that a defined relative movement is possible through the corresponding mechanical parts of the backrest modules 3. This position can be reached for example by means of an appropriate spring force. For a blocking of the movability around one or more axes the backrest modules 3 of the backrest 1 are pressed against each other by applying a force, so that at least two surfaces 10 each of two backrest modules 3 can form a positive fit that blocks the movability in a defined position. In this embodiment, pressing the backrest modules 3 against each other is equivalent to shortening the backrest 1.

Figure 5:
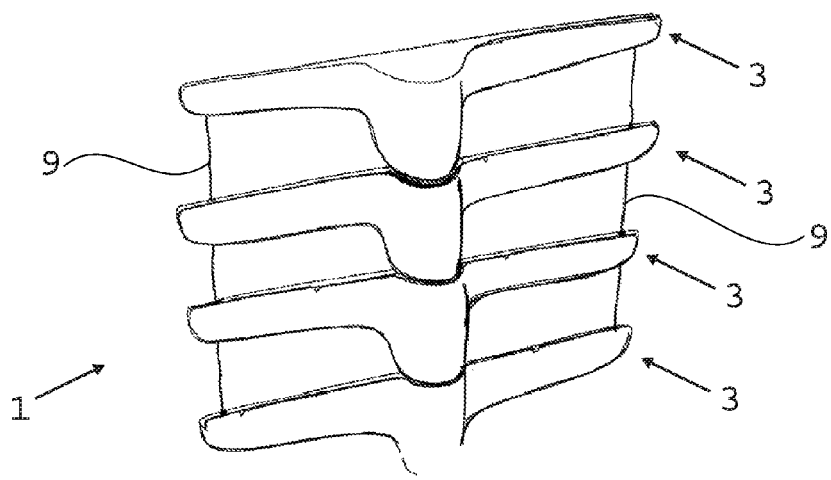
FIG. 5 shows blockable backrest modules comprising a rope linkage.

FIG. 5 shows a backrest 1 comprising several backrest modules 3 showing a blockable movability. In this embodiment, the backrest 1 further comprises a rope-like linkage 9 at both outer edges in the section of the wings 7. In different possible embodiments, the rope-like linkage 9 of the individual backrest modules 3 can be used to block the movability. With reference to the embodiment of FIG. 4, a shortening or compression of the backrest 1 pressing the backrest modules 3 against each other can be realized by means of an appropriate tensile force via the rope-like linkage 9. Accordingly, the rope-like linkage 9 may generate a tensile force between the topmost backrest module 3 and the lowermost backrest module 3 or a corresponding alternative part of the vehicle seat 2, so that the backrest modules 3 can be blocked in a basic position. In a similar, however alternative embodiment, only one rope-like linkage 9 is used, said linkage advantageously extending along or through the central portions 4 of the backrest modules 3.

In a further advantageous embodiment, which is able to block a relative movement of the backrest modules 3, especially a rotation of the backrest modules 3, the topmost backrest module 3 is blocked by additional mechanical means. The tensile stiffness of the rope-like linkage 9 together with a fixed lower backrest module 3 then results in a blocking of the movement of the backrest modules 3 located in the central section of the backrest 1.

Figure 6:
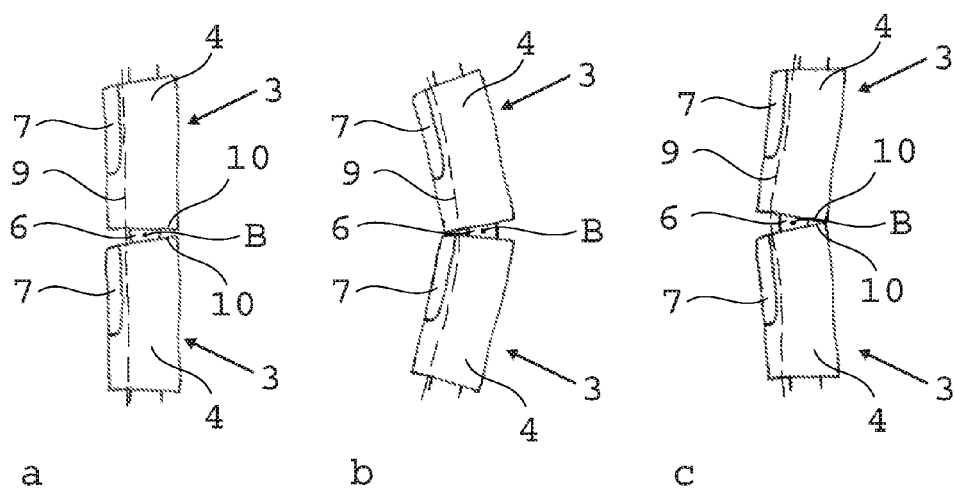
FIG. 6 shows backrest modules showing movability around a transverse axis.

FIG. 6 shows two backrest modules 3 of a backrest 1, which are movable relative to each other around a transverse axis B. In views a, b, c, each backrest module 3 is in a movable position, view a showing a spring-loaded basic position. The backrest modules 3 comprise a rope-like linkage 9 which extends along the central portion 4 being offset parallel to the center of the backrest modules 3 towards a sitting person.

In view b, the rope-like linkage is loaded by a sufficient tensile force, so that due to the geometric arrangement of the rope-like linkage 9 the backrest 1 is bent towards the back of a sitting person. The bending of the backrest 1 is limited by the surfaces 10 of the backrest modules 3 contacting each other in the front section. In a possible embodiment, the geometric arrangement of the rope-like linkage 9 and the relative movability of the backrest modules 3 further provide a flexibility in respect of forces acting against the bending. A further increase of the tensile force of the rope-like linkage 9 would make the backrest modules 3, which in this embodiment are movable relative to each other being spring-loaded, contact each other in the front and the back section of the surfaces 10, what is equivalent to a blocked position as is also shown in FIG. 4.

View c of FIG. 6 shows the relative movement of the two backrest modules 3 around the transverse axis B, until the surfaces 10 contact each other in the back section of the central portions 4. The flexibility of the backrest 1 thus is limited towards the back by the surfaces 10. The rope-like linkage 9 supports this limitation with a limited length preventing a further backward tilting as soon as the surfaces 10 have reached their contacting position in the back section of the central portions 4. In an advantageous embodiment, the possible bending of the backrest 1 out of the basic position shown in view a, due to the shaping of the surfaces 10, is larger in viewing direction of a sitting person than against the viewing direction, so that comfortable adjustments of the backrest 1 are offered.

Figure 7:
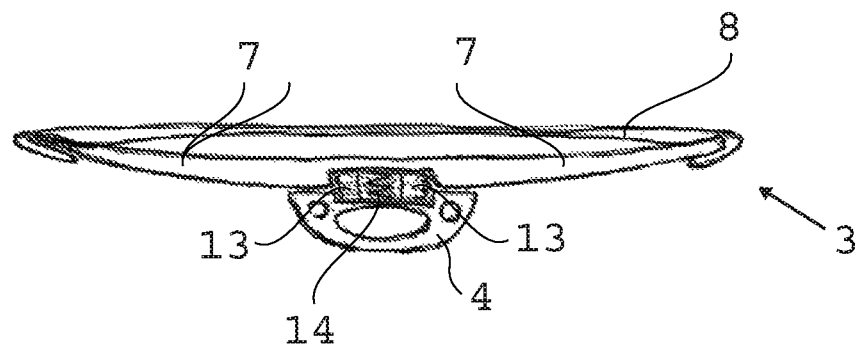
FIG. 7 shows a backrest module comprising movable wings in a blocked position.
Figure 8:
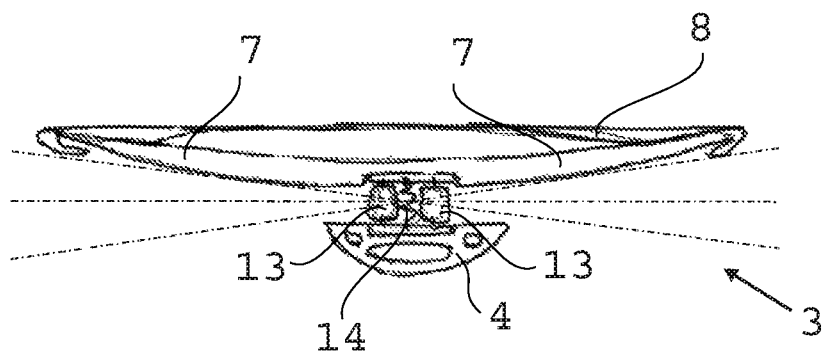
FIG. 8 shows a backrest module comprising movable wings in a released position.

FIG. 7 and FIG. 8 show an advantageous embodiment for a backrest module 3, at which the wings 7 are movably mounted on the central portion 4. The wings 7 are adapted to perform a spring-loaded rotation by at least 1 degree in relation to the central portion 4. In FIG. 7, the rotation of the wings 7 in relation to the central portion 4 is blocked. FIG. 8 shows the wings 7 with a released rotatability in relation to the central portion 4. In this embodiment, the upholstery 8 of the backrest module 3 is an elastomer upholstery which is spanned between the side edges of the wings 7.

In the embodiment of FIG. 7 and FIG. 8, two pneumatic modules 13 and a return spring 14 are located between the central portion 4 and the wings 7. The pneumatic modules 13 are gas-proof and can be loaded with overpressure by suited means. When loading the pneumatic modules 13 with overpressure a compressive force pushing the central portion 4 and the wings 7 apart is generated. The pneumatic module 13 may be for example a gas bag. In this embodiment, the return spring 14 is a tension spring which permanently produces a tensile force between the wings 7 and the central portion 4.

In FIG. 7, there is no overpressure in the pneumatic modules 13 or it is not high enough to overcome the counteracting tensile force of the return spring 14. The wings 7 thus bear against the central portion 4, by which a rotation is blocked and the wings 7 thus are fixed. The fixed position thus is the standard position that is reached if the pneumatic modules 13 are not loaded with overpressure compared to the atmospheric pressure or if there is a leakage in the pneumatic system or the pneumatic modules 13 are damaged. Advantageously, the rotation is not released until there is overpressure of more than one atmospheric pressure.

In FIG. 8, the pneumatic modules 13 have enough overpressure, so that they expand or even are inflated. The tensile force of the return spring 14 is overcome thereby, the return spring 14 is stretched and the rotation of the wings 7 is released by the same being spaced from the central portion 4.

The result is a spring-loaded rotatability of the wings 7 offering the corresponding comfort advantages. In this embodiment, the spring load of the rotation is effected by the pneumatic modules 13, as one pneumatic module 13 at a time is compressed in relation to the other pneumatic module 13 upon a rotation of the wings 7, generating a corresponding restoring force.

In a preferred embodiment, an individual restoring force upon a rotation of the wings 7 can be set by regulating the overpressure of the pneumatic modules 13. This can be carried out in the same way for all wings 7 located on the backrest 1 or individually. Furthermore, an individual restriction of the rotation can be realized by regulating the overpressure and spacing the wings 7 from the central portion 4 accordingly.

Figure 9:
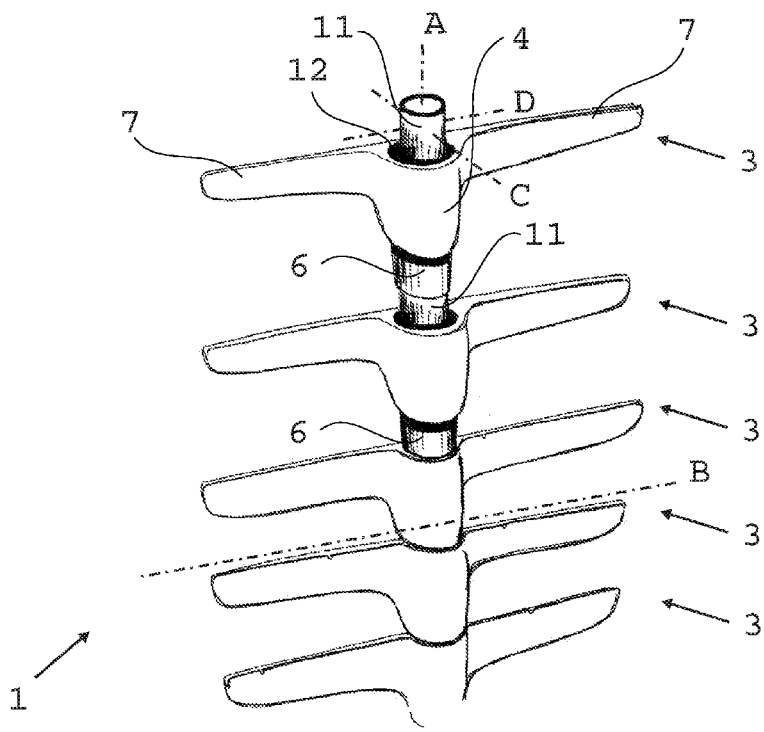
FIG. 9 shows an exploded view of a backrest comprising a support rod.

FIG. 9 shows an embodiment of a backrest 1 with several backrest modules 3 comprising a through opening 12 in the central portion 4. The through opening 12 is placed in the central portion 4 along the axis A. In this embodiment, the central axis of the through opening 12 is located coincidentally with the central axis of the connector element 6, so that the through opening 12 runs through the connector element 6. In this advantageous embodiment, a support rod 11 is located in the through openings 12 of the central portions 4. The support rod 11 advantageously extends through all backrest modules 3 and supports the same via the central portion 4.

In this embodiment, the backrest modules 3 are rotatable relative to each other around a first transverse axis B, no relative rotation of backrest modules 3 relative to each other around a second rotational axis being possible in this embodiment due to the design of the mechanical linkage between the backrest modules 3. The support rod 11 in one transverse rod axis advantageously shows a higher bending stiffness and in another transverse rod axis perpendicular thereto is more flexible. Furthermore, the support rod 11 advantageously is round. The support rod 11 may be an anisotropic or orthotropic material which provides a different stiffness or bending stiffness in two transverse rod axes C, D lying perpendicular to each other. This can be realized for example by the use of a corresponding fibrous composite structure.

In this embodiment, a blocking or a release of the movability of at least two backrest modules 3 around a transverse axis B thus can be effected by turning the support rod 11 by 90 degrees. Depending on the turned position of the two transverse rod axes C, D of the support rod 11 being turned together with the support rod 11 relative to the transverse axis B, the movability around the transverse axis B through turning the support rod 11 may be flexible or rather resilient or stiff, what may be equivalent to a blocking of the movability around the transverse axis B of the backrest 1.

Figure 10:
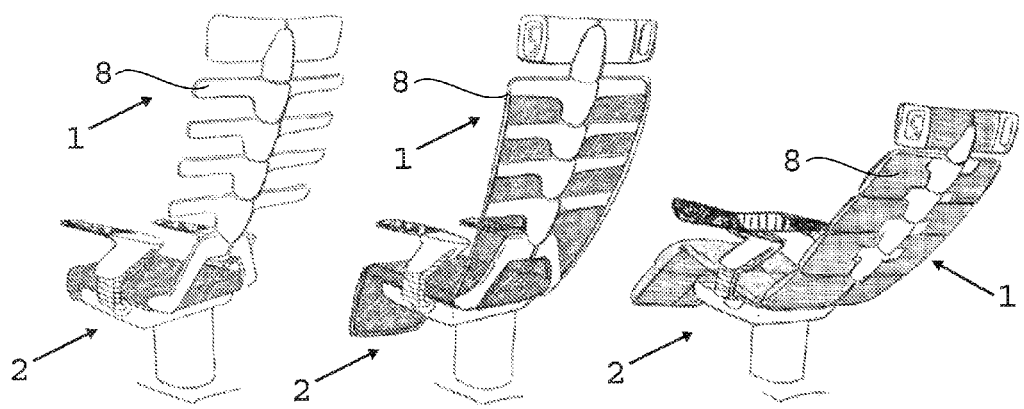
FIG. 10 shows several vehicle seats with backrests in different variants.

FIG. 10 shows several variants of a vehicle seat 2 with one backrest 1 each formed from several backrest modules 3. The backrest modules 3 comprise the same base body, especially in the central portion 4 of the backrest modules 3. A varying design of the vehicle seats 2 is easy to realize by varying the wings 7 and/or the backrest modules 3. Upholstery 8 may be arranged at the backrest modules 3, increasing the design flexibility. In possible embodiments of the backrest 1, the thicknesses of the upholstery may be designed to be very thin. The vehicle seat 2 may still be comfortable due to the corresponding movability or flexibility of the backrest modules 3.

The movability of individual backrest modules 3 further may contribute to an active seating comfort.

The invention claimed is:

1. A backrest for a vehicle seat, comprising:
   a plurality of backrest modules,
   wherein each backrest module of the plurality of backrest modules comprise a central portion, wherein at least one backrest module of the plurality of backrest modules is mechanically linked to one or two other backrest modules of the plurality of backrest modules at the central portion, wherein the backrest is configured such that each backrest module of at least two backrest modules of the plurality of backrest modules is movable relative to backrest modules of the at least two backrest modules adjacent to the each backrest module around a corresponding axis, wherein each pair of adjacent backrest modules of the at least two backrest modules comprise a corresponding positive engagement blocking mechanism having a blocking position such that, when the blocking position of the positive engagement blocking mechanism is engaged, the movability relative to each other around the corresponding axis of the each pair of adjacent backrest modules of the at least two backrest modules of the plurality of backrest modules is blocked, wherein the positive engagement blocking mechanism is configured to allow a user of the backrest to engage the blocking position of the positive engagement blocking mechanism.

2. The backrest according to claim 1,
wherein the blocking position of the positive engagement blocking mechanism of the each pair of adjacent backrest modules of the at least two backrest modules of the plurality of backrest modules is engaged via shortening the backrest along the axis.

3. The backrest according to claim 1,
wherein the blocking position of the positive engagement blocking mechanism of the each pair of adjacent backrest modules of the at least two backrest modules of the plurality of backrest modules is engaged via at least one rope-like linkage extending along the axis of the backrest.

4. The backrest according to claim 1,
wherein a backrest module of the plurality of backrest modules comprises an attachment point for a safety belt.

5. The backrest according to claim 1,
wherein the at least two backrest modules of the plurality of backrest modules engage into each other at a corresponding at least two central portions of the at least two backrest modules.

6. The backrest according to claim 1,
wherein one or more backrest module of the plurality of backrest modules comprises a corresponding one or more recess on a first side of the central portion of the corresponding one or more backrest module for mounting a connector element of an adjacent backrest module of the plurality of backrest modules,
wherein the one or more backrest module comprises a connector element on a second side of the central portion of the corresponding one or more backrest module.

7. The backrest according to claim 6,
wherein the connector element of each of the one or more backrest module has a shape of a journal.

8. The backrest according to claim 1,
wherein one or more backrest module of the plurality of backrest modules comprises two side wings that extend from the central portion of the corresponding one or more backrest module.

9. The backrest according to claim 8,
wherein the two side wings of each one or more backrest module are exchangeable at the central portion of the corresponding one or more backrest module.

10. The backrest according to claim 8,
wherein the two side wings of each one or more backrest module are movably mounted on the central portion of the corresponding one or more backrest module.

11. The backrest according to claim 1,
wherein one or more backrest module of the plurality of backrest modules comprises upholstery on at least one side of the corresponding one or more backrest module.

12. The backrest according to claim 11, wherein at least two backrest modules of the plurality of backrest modules comprise upholstery with one or more of the following: different firmnesses, different thicknesses, and different covers.

13. The backrest according to claim 1,
wherein two or more backrest modules of the plurality of backrest modules are movable relative to each other along the axis.

14. The backrest according to claim 1,
wherein two or more backrest modules of the plurality of backrest modules are movable relative to each other around a transverse axis, wherein the transverse axis is perpendicular to the axis.

15. The backrest according to claim 1,
wherein one or more backrest module of the plurality of backrest modules comprises a corresponding one or more through opening in a corresponding one or more central portion of the corresponding one or more backrest module along the axis,
wherein the backrest further comprises a support rod, wherein the support rod is located in the one or more through opening of the corresponding one or more backrest module.

16. The backrest according to claim 15,
wherein the support rod has a lower bending stiffness in a direction of a first transverse rod axis than in a direction of a second transverse rod axis located perpendicular to the first transverse rod axis.

17. The backrest according to claim 15,
wherein the blocking position of the positive engagement blocking mechanism of the each pair of backrest modules of the at least two backrest modules of the plurality of backrest modules is engaged via mechanically actuating the support rod.

18. The backrest according to claim 1,
wherein each backrest module of the at least two backrest modules of the plurality of backrest modules comprises a corresponding recess and a corresponding connector element,
wherein each pair of adjacent backrest modules of the at least two backrest modules engage into each other via a connector element of one backrest module of each pair of adjacent backrest modules engaging into a recess of another backrest module of the each pair of adjacent backrest modules.

19. The backrest according to claim 18,
wherein for each pair of adjacent backrest modules of the at least two backrest modules the corresponding axis is a longitudinal axis of the recess of the another backrest module of the each pair of adjacent backrest modules.

20. The backrest according to claim 1,
wherein the positive engagement blocking mechanism has a non-blocking position, wherein when the positive engagement blocking mechanism is in the non-blocking position, the movability relative to each other around the axis of the each pair of adjacent backrest modules of the at least two backrest modules of the plurality of backrest modules is not blocked by the positive engagement blocking mechanism, wherein the positive engagement blocking mechanism is configured to allow a user of the backrest to disengage the blocking position of the positive engagement blocking mechanism such that the positive engagement blocking mechanism is in the non-blocking position when the blocking position is disengaged.

\* \* \* \* \*